(No Model.)
D. A. McKNIGHT.
ELASTIC TIRED WHEEL.
No. 599,517. Patented Feb. 22, 1898.
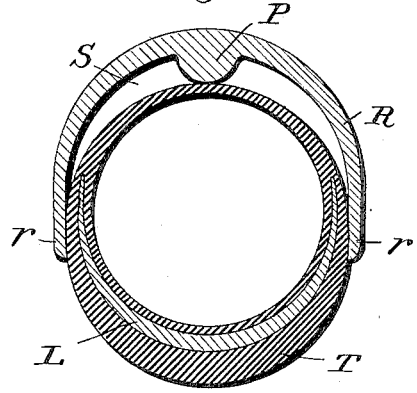
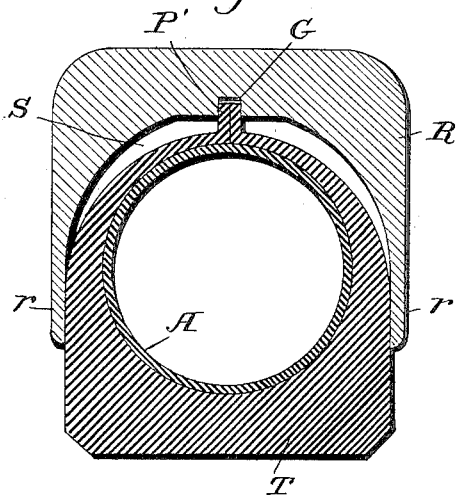
Witnesses
Inventor
David A. McKnight

United States Patent Office.

DAVID A. McKNIGHT, OF WASHINGTON, DISTRICT OF COLUMBIA.

ELASTIC-TIRED WHEEL.

SPECIFICATION forming part of Letters Patent No. 599,517, dated February 22, 1898.

Application filed April 20, 1897. Serial No. 633,029. (No model.)

*To all whom it may concern:*

Be it known that I, DAVID A. MCKNIGHT, a citizen of the United States, residing at Washington, in the District of Columbia, have invented certain new and useful Improvements in Elastic-Tired Wheels; and I do hereby declare the following to be a full, clear, and exact description of the invention, such as will enable others skilled in the art to which it appertains to make and use the same.

My invention relates to vehicle-wheels having channeled rims and side flanges and furnished with rubber or other elastic tubular tires; and it consists primarily in providing the rim with a central seat for one or both tubes, whereby when the tire is in place there shall be on either side of its seat, at the bottom of the channel, spaces between the tube and the rim into which the inner side of the tube may sink when under load, and in making the inner side of the tire compressible and its outer and intermediate sides noncompressible or rigid, or substantially so, transversely, whereby when under load the tire will not be compressed at the outer side or pressed out at the intermediate sides, but will be compressed at its inner side alone, the several parts being so arranged that when the wheel is running under load the tire shall have a reciprocating motion between the side flanges over its point of contact with the ground.

By the term "tubular tire" in this specification is meant a hollow tire, whether the tube is cylindrical or otherwise shaped.

By the term "tread-tube" is meant the tube which comes in contact with the ground, whether the tire be a single or a double tube tire and whether the outer tube or casing completely or only partially covers the inner tube. By the term "rigid" is meant any desired degree of rigidity sufficient to cause the outer and intermediate sides to resist the change of shape above described, and by the terms "inner side," "outer side," and "intermediate sides" of the tube or tire are meant, respectively, the rim portion or that part adapted to flatten against the rim, the tread portion or that part which is liable to come in contact with the ground, and the two parts midway between the rim and tread portions.

In the drawings, Figures 1 and 2 show, respectively, a single and a double tube pneumatic tire in section, and they illustrate different forms of applying my invention to a wheel-rim, which are at present preferred forms, the invention, however, not being confined to any of the details of construction shown apart from those above mentioned.

R represents a wheel-rim having a channeled face, and $r$ and $r$ are its two sides or flanges, which loosely engage the intermediate sides of the tire and protect it from undue rolling.

P is a central peripheral projection or rib in the bottom of the channel, and it constitutes the seat for the tire.

P' is a peripheral projection or rib on the inner side of the tube and may be either split or solid. It is shown in Fig. 2 as resting in groove G, and it is the equivalent of rib P.

T is the tread-tube or casing, and A the inner tube, of the tire.

S and S are spaces on either side of the rib.

In both the figures the outer and intermediate sides of the tread-tubes are shown as quite thick, whereby the requisite transverse rigidity is secured, and in Fig. 1 the shield L, of metal or other suitable material, gives additional rigidity to them. It is to be understood that the intermediate sides of the tire are rigid in themselves and are not merely held rigidly against expansion by the flanges or sides of the rim. So constructed, a rubber tire when running under load would be protected from puncture. It would not be pressed in at the outer side or pressed out at the intermediate sides. It would be compressed at its inner side alone, and the intermediate sides would slide easily up and down against flanges $r$ and $r$ of rim R. Being protected from exterior injury, the inner side of the tube may be made quite thin, with the effect of increasing the resilience of the tire. The outer side of the tire being rigid, the curved tread shown in Fig. 1 would always present the least surface to the roadway to the avoidance of a great deal of friction, and since the varying movements of the inner side of the tube when running under load would be without friction a pneumatic tire would not require to be blown up so tightly, and the resilience of its air-cushion would be thereby greatly increased.

The tire may be secured upon its seat in a variety of ways, which, being no part of my invention, I do not herein describe.

I do not herein claim the tire having rigid sides as herein described, or the rigid puncture-proof armor embedded in the outer segment of the tire, but reserve the same for another application, which is pending, Serial No. 659,980.

Having thus fully described my invention, what I claim, and desire to secure by Letters Patent, is—

1. In combination with a vehicle-wheel rim having side flanges, a tubular tire having rigid outer and intermediate sides and a compressible inner side, said tire and the rim of the wheel being so arranged that its tube or tubes shall have a reciprocating motion between the side flanges and that its inner side shall be compressed by the rim when running under load, substantially as described.

2. A tubular tire having a compressible inner side and rigid outer and intermediate sides in combination with a wheel-rim having a channeled face and side flanges and in the channel a seat for the tire with spaces on either side of the seat between the bottom of the channel and the tire, substantially as described.

3. In combination with a wheel-rim having side flanges adapted to loosely engage the intermediate sides of the tire, a tubular tire having a compressible inner side and rigid outer and intermediate sides and a peripheral rib centrally interposed between the tire and the rim as a seat for the tire, substantially as described.

4. In combination with a wheel-rim having side flanges, a tubular tire having its inner side compressible and its intermediate sides rigid, said rim and the tread-tube of said tire having normally a narrow contact in their median lines with spaces on either side of said line of contact, and being so arranged that when running under load the tire shall have a reciprocating motion between the side flanges, substantially as described.

In testimony whereof I affix my signature in presence of two witnesses.

DAVID A. McKNIGHT.

Witnesses:
APPLETON P. CLARK,
ALLEN C. CLARK.